United States Patent Office 3,470,258
Patented Sept. 30, 1969

3,470,258
FLUORINATED ALCOHOLS-GLYCIDOL ADDITION PRODUCTS
Giuliana C. Tesoro, Dobbs Ferry, N.Y., assignor to J. P. Stevens & Co., Inc., New York, N.Y., a corporation of Delaware
No Drawing. Filed Apr. 19, 1967, Ser. No. 632,011
Int. Cl. C07c *43/18*
U.S. Cl. 260—615
7 Claims

ABSTRACT OF THE DISCLOSURE

Mixtures of novel compounds included within the structural formula:

$$R_f-CH-O-(CH_2QO)_p-(CH_2DO)_sH$$
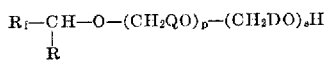

wherein R is H or CF$_3$,

Q is $-CH-$ or $-CHCH_2-$, D is $-CH-$ or $-CHCH_2-$
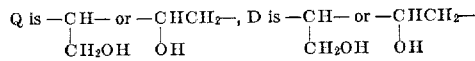

$p$ is a number from 1 to 20, $s$ is a number from 0 to 20, the sum of $p+s$ is from 1 to 20, and $R_f$ is a fluorinated alkyl radical containing 1 to 15 carbon atoms, which are suited as surface active agents and emulsifiers.

---

The present invention relates to novel organic fluorine containing compounds which are suitable as surface active agents and emulsifiers having desirable low foaming characteristics of aqueous solutions thereof and exceptional solubility characteristics.

Extensive work has been directed toward the development of surface active agents which, as is known, are generally employed in aqueous solutions and other media to reduce the surface tension of the solution.

Recently it has been proposed to employ as surface active agents fluorinated alcohol-ethylene oxide condensates in which perfluoroalkyls constitute the hydrophobic moiety and polyethers having unsubstituted recurring units, constitute the hydrophilic moiety. Although these surface active agents are generally effective for a variety of applications, nevertheless, there is a practical limit to their efficiency due to the structure of the hydrophilic moiety.

I have discovered new compounds which are particularly suitable as surface active agents and emulsifiers and which have exceptional solubility characteristics. These compounds contain hydroxy groups in the hydrophilic moiety which render the compounds more water soluble. I have also found that surprisingly, these compounds maintain their characteristics in acid media having a high acid concentration, for example a 75% or more sulphuric acid concentration, and that these characteristics are maintained for extended periods of time. In addition, these new compounds are effective surface active agents when employed in extremely low concentrations, in some cases in concentrations of 0.001% by weight.

The new products of this invention are the addition products of a fluorinated alcohol with 2,3-epoxy-1-propanol (glycidol) and can be defined as fluorinated alkyl ethers of glycerol or poly-glycerol having the following structural formula:

$$R_f-CH-O-(CH_2QO)_p-(CH_2DO)_sH$$
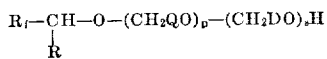

wherein R is H or CF$_3$,

Q is $-CH-$ or $-CHCH_2-$, D is $-CH-$ or $-CHCH_2-$
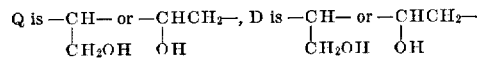

$p$ is a number from 1 to 200, $s$ is a number from 0 to 200, the sum of $p+s$ is from 1 to 200, and $R_f$ is a fluorinated alkyl radical such as

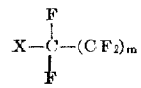

wherein X is H or F, and $m$ is a number from 0 to 24.

The fluorinated alkyl ethers of the invention are prepared by the addition reaction of a fluorinated primary or secondary alcohol with glycidol according to the following general equation:

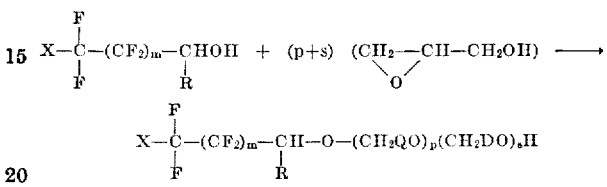

wherein X, $m$, R, Q, D, $p$ and $s$ have the above values.

Numerous known types of fluorinated alcohol starting materials may be employed according to the present invention, the particular type selected depending upon the type of product desired. These type compounds and/or their preparation have been described in the literature, such as, for example in U.S. Patent 2,559,628 issued to Robert M. Joyce on July 10, 1951, and the publication entitled "New Product Information," Du Pont Organic Chemicals Department, E. I. du Pont de Nemours, Inc., dated Dec. 19, 1962.

Merely as illustrative the following compounds may be employed as fluorinated reactants according to the present invention:

1H,1H,7H-dodecafluoro-1-heptanol;
1H,1H,9H-hexadecafluoro-1-nonanol;
3-(1H,1H,7H-dodecafluoroheptyloxy)-1,2-propanediol;
1H,1H,11H-eicosafluoro-1-undecanol;
1H,1H-pentadecafluoro-1-octanol;
1H,1H,5H-octafluoro-1-pentanol;
1H,1H,5H-hexadecafluoro-1-nonanol;
2H-hexafluoro-2-propanol;
2,2,3,3-tetrafluoro-1-propanol;
1H,1H-heptafluoro-1-butanol;
2,2,2-trifluoroethanol.

The constitution of the products of the reaction can be changed by varying the proportion of the reactants in the reaction mixture. By reacting equimolar proportions of the fluorinated alcohol and the 2,3-epoxy-1-propanol, the resultant product is the fluorinated alkyl monoether of glycerol as shown in the following equation:

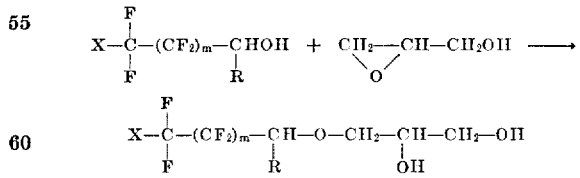

wherein X, $m$, and R are as above defined.

Thus, when the reactants are employed in a molar ratio of 1:1, the 1-to-1 adduct results. When molar ratios greater than 1:1 are employed such as 1:2 or more, compounds are produced which can be represented by the following structural formula:

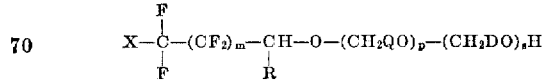

wherein X, m, R, Q, D, s and p have the above values and the sum of p+s is from 2 to 200.

In products of the type wherein hydroxyl groups are appended to the polyether chain the resultant products have excellent solubility potentialities. In addition they contribute to the hydrophile-hydrophobe balance of the fluorinated derivatives. Another important advantage of having a secondary hydroxyl group appended to the polyether chain is that further reactions are possible. For example, the compounds having secondary hydroxyls may be oxidized to or dehydrogenated to alpha-hydroxy ketones as shown in the following equation:

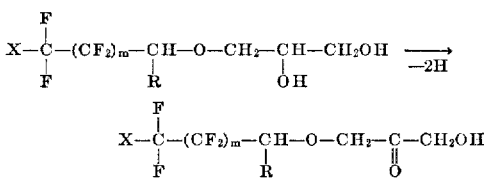

wherein X, m, and R, have the above values. Suitable hydrogen acceptors are ketones such as cyclohexanone and acetone in the presence of excess aluminum isopropoxide or tert-butoxide, the reaction being effected in 4 to 20 hours in hot benzene, toluene, or xylene.

Likewies, these compounds can be converted to useful linear polyesters as shown in the following equation:

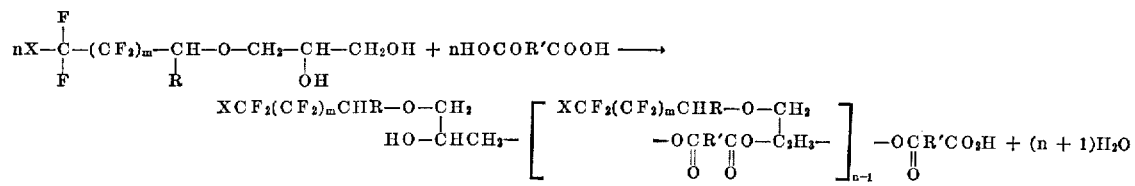

wherein X, m, and R have the above values and wherein R' is a divalent organic group such as connects carboxyl radicals in dibasic acids.

Polyesterification can be accomplished by heating substantially equimolar quantities of diol and dicarboxylic acid, either without a catalyst or with one, and either without a solvent or with a solvent, preferably a water-immiscible liquid such as toluene, xylene, or carbon tetrachloride which enables water produced as a by-product to be removed azeotropically. Small amounts of strong acids are effective catalysts, such as p-toluenesulfonic acid, methanesulfonic acid and trichloroacetic acid. The preferred range of temperature is 70 to 150° C.

Maleic acid, fumaric acid, dichloromaleic acid, itaconic acid, citraconic acid, and mesaconic acid, that is alpha-beta-ethylenically unsaturated dicarboxylic acids containing 4 or 5 carbon atoms are especially suitable for the production of the polyesters. Saturated dicarboxylic acids which may be used are adipic acid, phthalic acid, isophthalic acid, succinic acid, endomethylenehexachlorotetrahydrophthalic acid, glutaric acid, heptadecanedicarboxylic acid, terephthalic acid, thiodiacetic acid, sulfonyldiacetic acid, and oxydiacetic acid.

The number of moles of gylcidol wihch may be reacted with the fluorinated alcohol may vary from one mole of glycidol per mole of fluorinated alcohol up to as high as 200 moles or more of the gylcidol per mole of the fluorinated alcohol. For the use of the compounds as surface active agents, however, it has ben found that about one mole to about 30 moles of glycidol per mole of fluorinated alcohol produces satisfactory results with optimum results being obtained when about 3 to 20 moles of glycidol per mole of fluorinated alcohol are employed.

Although it is not essential, it is however preferred that the reaction be conducted in the presence of a catalyst. Catalysts suitable in the reaction are aliphatic tertiary amines such as triethylamine, tributylamine, and N-methylmorpholine. Triethylamine is perferred because it is inexpensive and because it results in the production of a product substantially free of color. There can also be employed as catalyst non-aliphatic tertiary amines such as pyridine, alpha-picoline, 2, 6-lutidine, and 5-ethyl-2-methylpyridine; however, these catalysts are not as desirable because they tend to give discolored products.

The temperature at which the reaction is effected may be varied over a wide range, depending upon the nature of the reactants, the catalyst employed, the results desired, and other conditions of the reaction. Generally, however, the temperature may be varied over a range of about 25 to 150° C. preferably 80 to 120° C.

It will of course be realized that the products obtained at any specific reaction temperature will not comprise solely a polyether of a single degree of polymerization but will comprise a range of polyethers differing in their degree of polymerization.

Advantageously, the reaction is conducted at atmospheric pressure, although superatmospheric or subatmospheric pressures may be employed if desired.

The manner of mixing the reactants is not critical. Generally, the reactants including the catalyst are added to a reaction vessel which is provided with temperature control means for maintaining the temperature within the desired ranges. In addition, the reaction vessel can be equipped with mechanical agitating means for mechanically agitating the reaction vessel for the reaction period.

In a more preferred technique, however, the glycidol is added slowly or portion-wise to a heated, agitated mixture of fluorinated alcohol and catalyst. The preferred catalyst is an aliphatic tertiary amine, particularly triethylamine.

While the present invention is further illustrated by the following examples, it is not intended to be limited to these examples. In the following examples, percentages are by weight and the temperatures are expressed in degrees centigrade. The evaluation test method and/ or apparatus employed in the examples were as follows.

Ross-Miles foam height.—ASTM D1173–53, "Standard Method of Test for Foaming Properties of Surface-Active Agents," ASTM Standards 1958, part 10, pp. 878–880.

Surface tension.—The apparatus employed was a Fisher Surface Tensiometer with a ring of platinum-iridium.

EXAMPLE 1

Addition products of 1H,1H,7H-dodecafluoro-1-heptanol and 2,3-epoxy-1-propanol, using triethylamine as catalyst 2,3-epoxy-1-propanol (74 grams, 1.0 mole) was added dropwise to a stirred mixture maintained at 120±5° C. (under nitrogen) composed of 66.4 grams (0.2 mole) of technical-grade 1H, 1H, 7H-dodecafluoro-1-heptanol and 5 ml. of triethylamine. The temperature of the reaction mixture was maintained by externally heating or cooling as required. After all of the 2,3-epoxy-1-propanol had been added, the reaction mixture was stirred for an additional hour while the temperature was maintained at 120° C. The resulting product was a pale yellow viscous oil, which was readily soluble in water.

Properties confirmed the presence of compounds of the structure

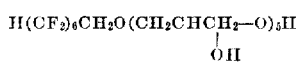

and

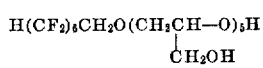

as well as structures of like molecular weight containing recurring units of

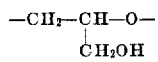

and

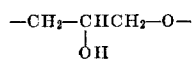

in the same molecule.

All except 3% of the original 2,3-epoxy-1-propanol had entered into the reaction, that is, the extent of conversion was about 97%. The product exhibits very effective active surface properties in water, as shown by the following results.

| Percent concentration of product by weight: | Surface tension (26° C.), dynes/cm. |
|---|---|
| 1.0 | 25.1 |
| 0.1 | 26.9 |
| 0.01 | 34.4 |
| None (water alone) | 71.8 |

EXAMPLE 2

Additional products of 1H,1H,9H-hexadecafluoro-1-nonanol and 2,3-epoxy-1-propanol, using triethylamine as catalyst The procedure of Example 1 was repeated except that technical-grade 1H,1H,9H-hexadecafluoro-1-nonanol (86.4 grams, 0.2 mole) was used instead of the dodecafluoroheptanol. The resulting product had pale yellow color and was water-soluble.

Properties confirmed the presence of compounds of the structure

H(CF$_2$)$_8$CH$_2$O(CH$_2$CHCH$_2$O)$_5$H
|
OH and

H(CF$_2$)$_8$CH$_2$O(CH$_2$CH$_2$O)$_5$H
|
CH$_2$OH as well as structures of like molecular weight containing recurring units of

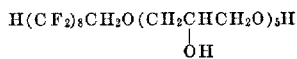

and

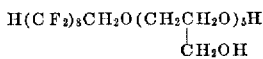

in the same molecule. All except 3% of the original 2,3-epoxy-1-propanol had entered into reaction, that is, the extent of conversion was about 97%. The following data show that this product also is a superior surface active agent.

| Percent concentration of produced by weight: | Surface tension (26° C.), dynes/cm. |
|---|---|
| 1.0 | 30.7 |
| 0.1 | 28.4 |
| 0.01 | 28.5 |
| 0.001 | 40.6 |

EXAMPLE 3

Addition products of 1H,1H,11H-eicosafluoro-1-undecanol and 2,3-epoxy-1-propanol, using triethylamine as catalyst The procedure of Example 1 was repeated except that technical grade 1H,1H,11H-eicosafluoro-1-undecanol (106.4 grams, 0.2 mole) was used instead of 1H,1H,7H-dodecafluoroheptanol. The resulting product was a pale yellow soft wax. Properties confirmed the presence of compounds of the structure:

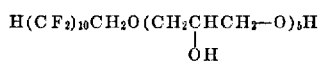

and

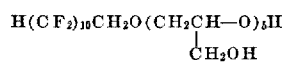

as well as structures of like molecular weight containing recurring units of

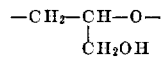

and

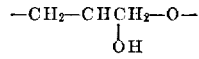

in the same molecule. All except 2% of the original 2,3-epoxy-1-propanol had entered into reaction, that is, the extent of conversion was about 98%. The following data attest to the surface-lowering activity.

| Percent concentration, of product by weight: | Surface tension (26°), dynes/cm. |
|---|---|
| 1.0 | 29.4 |
| 0.1 | 29.6 |
| 0.01 | 35.5 |

EXAMPLE 4

Preparation of 3-(1H,1H,7H-dodecafluoroheptyloxy)-1,2-propanediol, using pyridine as catalyst

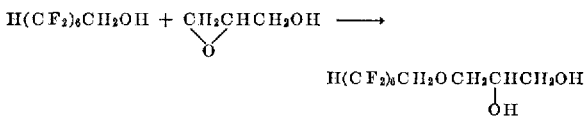

A mixture of 166 grams (0.5 mole) of technical-grade 1H,1H,7H-dodecafluoro-1-heptanol, 37 grams (0.5 mole) of 2,3-epoxy-1-propanol, and 0.5 ml. of pyridine was heated to 80° C. and kept at that temperature for 12 hours. An additional 0.5 ml. portion of pyridine was added at the end of the 4th hour and also at the end of the 8th hour. The reaction mixture was subjected to distillation at a pressure of 0.1 mm. of mercury. The main fraction, distilling between 110 and 120° C. weighed 108 grams (53.2% of the theoretical yield).

*Analysis.*—Required by C$_{10}$H$_{10}$F$_{12}$O$_3$: C, 29.6%; H, 2.47%; F, 56.2%. Found: C, 31.5%; H, 2.97%; F. 54.2%.

EXAMPLE 5

Addition products of 1H,1H,7H-dodecafluoro-1-heptanol and 2,3-epoxy-1-propanol, using pyridine as catalyst A mixture of 33.2 grams (0.1 mole) of 1H,1H,7H-dodecafluoro-1-heptanol, 74 grams (1 mole) of 2,3-epoxy-1-propanol, and 0.5 ml. of pyridine was heated to 90° C., which was maintained for 12 hours. Properties confirm the presence of compounds of the structure

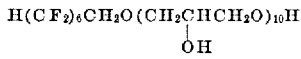

and

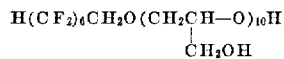

as well as structures of like molecular weight containing recurring units of

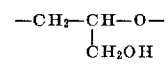

and

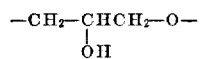

in the same molecule. Analysis of unreacted epoxide at the end of that period indicated 98.5% conversion. The product made by this procedure was a dark brown viscous liquid. It was effective at low concentration in lowering the surface tension of water, as shown in the following data.

| Percent concentration of product by weight | Surface tension, 26° C. dynes/cm. | Ross-Miles foam height (mm.) | |
|---|---|---|---|
| | | Initially | After 5-Min. |
| 0.01 | 53 | | |
| 0.1 | 33 | 20 | 0 |
| 1.0 | 25 | | |

EXAMPLE 6

Addition product of 1H,1H,11H-eicosafluoro-1-undecanol and 2,3-epoxy-1-propanol reacted in the ratio of 1:10 by moles using pyridine as catalyst A mixture of 53.2 grams (0.1 mole) of 1H,1H,11H-eicosafluoro-1-undecanol, 74 grams (1 mole) of 2,3-epoxy-1-propanol, and 1 ml. of pyridine was heated at 100° C. for 24 hours. By that time the conversion was 97%. The product was a dark solid.

Properties confirm the presence of compounds of the structure

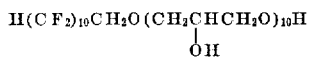

and

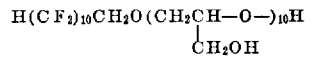

as well as structures of like molecular weight containing recurring units of

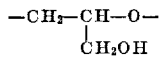

and

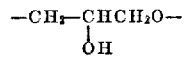

in the same molecule. It has good surface activity in water, as is evident from the following data.

| Percent concentration of product by weight | Surface tension, 26° C. dynes/cm. | Ross-Miles foam height (mm.) | |
|---|---|---|---|
| | | Initially | After 5-Min. |
| 0.01 | 37 | | |
| 0.1 | 28 | 16 | 6 |
| 1.0 | 27 | | |

EXAMPLE 7

Addition product of 1H,1H-pentadecafluoro-1-octanol and 2,3-epoxy-1-propanol reacted in the ratio of 1:5 by moles, using triethylamine as catalyst 2,3-epoxy-1-propanol (37 grams, 0.5 mole) was added dropwise to a stirred mixture kept at 120±5° C. (under nitrogen) composed of 40 grams (0.1 mole), of 1H,1H-pentadecafluoro-1-octanol and 3 ml. of triethylamine. Cooling by a bath of water was necessary to maintain the desired temperature during the course of the addition, which took 30 minutes. The temperature of the reaction mixture was maintained at 120° C. for an additional hour to bring the reaction to completion, which was determined by the absence of unreacted 2,3-epoxy-1-propanol.

Properties confirm the presence of compounds of the structure

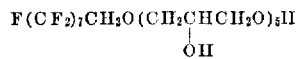

and

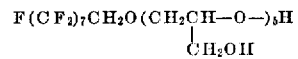

as well as structures of like molecular weight containing recurring units of

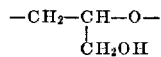

and

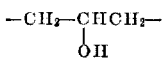

in the same molecule.

The following table shows that, even in low concentration, the addition product was remarkably effective in lowering the surface tension of water (27° C.).

| Percent concentration of product by weight: | Surface tension, dynes/cm. |
|---|---|
| None (water alone) | 71.1 |
| 0.001 | 30.2 |
| 0.01 | 17.0 |
| 0.1 | 17.3 |
| 1.0 | 17.2 |

EXAMPLES 8, 9, AND 10

Addition products of 1H,1H-pentadecafluoro-1-octanol and 2,3-epoxy-1-propanol reacted in various ratios, using triethylamine as catalyst The procedures of Example 7 were repeated, the quantity of 2,3-epoxy-1-propanol being varied as indicated in the following table. Values from Example 7 are included to facilitate comparison.

| Example | Molar ratio | Surface tension, dynes/cm. | | | |
|---|---|---|---|---|---|
| | | 0.001% | 0.01% | 0.1% | 1% |
| 8 | 1:3 | 27.5 | 17.8 | 18.0 | |
| 7 | 1:5 | 30.2 | 17.0 | 17.3 | 17.2 |
| 9 | 1:10 | 43.8 | 18.0 | 17.4 | 18.1 |
| 10 | 1:20 | 52.4 | 22.5 | 19.7 | 19.5 |

EXAMPLES 11 THROUGH 23

Addition products of individual polyfluoro-1-alkanols and 2,3-epoxy-1-propanol reacted in various ratios, using triethylamine as catalyst The procedure of Example 1 was repeated, the specific polyfluoro-1-alkanol and quantities being varied in accordance with the following table. Values form Examples 1, 2, and 3 are included to show their relationship to the other examples.

| Example | Fluoro-Alcohol Reactant | Moles of Glycidol | Surface tension, dynes/cm. | | |
|---|---|---|---|---|---|
| | | | 0.01% | 0.1% | 1% |
| 11 | H(CF₂)₄CH₂OH | 3 | 52.8 | 44.1 | 30.8 |
| 12 | H(CF₂)₄CH₂OH | 5 | 59.4 | 46.6 | 31.4 |
| 13 | H(CF₂)₄CH₂OH | 10 | 55.7 | 52.0 | 32.7 |
| 14 | H(CF₂)₆CH₂OH | 3 | 45.0 | 27.0 | 24.6 |
| 1 | H(CF₂)₆CH₂OH | 5 | 34.4 | 26.9 | 25.1 |
| 15 | H(CF₂)₆CH₂OH | 10 | 47.2 | 28.6 | 26.0 |
| 16 | H(CF₂)₆CH₂OH | 15 | 45.4 | 29.5 | 27.3 |
| 17 | H(CF₂)₈CH₂OH | 3 | 26.7 | 24.5 | |
| 2 | H(CF₂)₈CH₂OH | 5 | 28.5 | 28.5 | 30.7 |
| 18 | H(CF₂)₈CH₂OH | 10 | 27.5 | 25.6 | |
| 19 | H(CF₂)₈CH₂OH | 15 | 30.2 | 27.0 | 26.4 |
| 20 | H(CF₂)₈CH₂OH | 20 | 36.0 | 26.0 | |
| 3 | H(CF₂)₁₀CH₂OH | 5 | 35.5 | 29.6 | 29.4 |
| 21 | H(CF₂)₁₀CH₂OH | 10 | 33.5 | 29.8 | |
| 22 | H(CF₂)₁₀CH₂OH | 15 | 34.3 | 29.5 | |
| 23 | H(CF₂)₁₀CH₂OH | 20 | 35.2 | 31.0 | 31.2 |

EXAMPLE 24

This example illustrates the effectiveness of the product of Example 8 in a severely acid environment.

At approximately 26° C., the surface tension of 75% sulfuric acid was found to be 67 dynes/cm. When the product of Example 8 was added to the extent of 0.1% by weight to the 75% sulfuric acid, the surface tension dropped initially to 27.9 dynes/cm. After the solution had been kept at room temperature for 24 hours, the surface tension remained practically constant (28.0 dynes/cm.), indicating good stability and effectiveness under conditions of severe acidity.

EXAMPLE 25

Preparation of 3 - (2,2,3,3-tetrafluoropropoxy)-1,2-propanediol, using triethylamine as catalyst

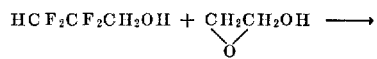

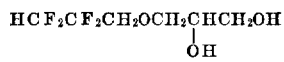

2,3-epoxy-1-propanol (37.0 grams, 0.5 mole) was added dropwise to a stirred mixture kept at 120±5° C. (under nitrogen) composed of 66.6 grams (0.5 mole) of 2,2,3,3-tetrafluoro-1-propanol and 3 ml. of triethylamine. The processing method of Example 1 was used, followed by distillation at reduced pressure. A good yield of the purified adduct, 3-(2,2,3,3-tetrafluoro-propoxy)-1,2-propanediol, was collected between 93 and 94° C. at 0.45 mm. of mercury.

A purity of at least 95% was indicated by means of gas-liquid chromatography.

*Analysis.*—Required by $C_6H_{10}F_4O_3$: C, 34.96%; H, 4.89%. Found: C, 35.43%; H, 4.91%.

Surface tensions of 0.01%, 0.1%, and 1% aqueous solutions of this 1-to-1 adduct of $H(CF_2)_2CH_2OH$ and 2,3-epoxy-1-propanol were respectively 66.5, 59.0, and 38 dynes per centimeter.

EXAMPLE 26

Preparation of 3-(1H,1H,5H-octafluoropentyloxy)-1,2-propanediol

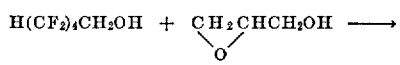

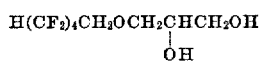

The 1-to-1 adduct of 1H,1H,5H-octafluoro-1-pentanol and 2,3-epoxy-1-propanol was prepared by using a procedure similar to that of Example 25. The product, 3-(1H,1H,5H - octafluoropentyloxy)-1,2-propanediol, was collected at 106° C. at 0.3 mm. of mercury. A purity of at least 95% was indicated by means of gas-liquid chromatography.

*Analysis.*—Required by $C_8H_{10}F_8O_3$: C, 31.4%; H, 3.3%. Found: C, 31.1%; H, 3.47%.

Surface tensions of 0.01% and 1% aqueous solutions of this 1-to-1 adduct of $H(CF_2)_4CH_4OH$ and 2,3-epoxy-1-propanol were respectively 68.2, 57.6, and 34.5 dynes per centimeter.

EXAMPLE 27

Preparation of 3-(1H,1H,5H-hexadecafluorononyloxy)-1,2-propanediol

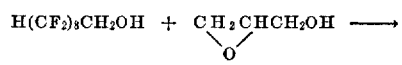

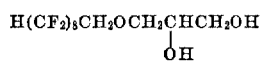

The 1-to-1 adduct of 1H,1H,5H-hexadecafluoro-1-nonanol and 2,3 - epoxy - 1 - propanol was prepared by using a procedure similar to that of Example 25. The product, 3 - (1H,1H,5H - hexadecafluorononyloxy)-1,2-propanediol, was isolated by distillation at 128° C. at 0.1 mm. of mercury. This is the 1-to-1 adduct of

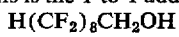

$H(CF_2)_8CH_2OH$ and 2,3-epoxy-1-propanol.

*Analysis.*—Required by $C_{12}H_{10}F_{16}O_3$: C, 28.5%; H, 2.0%. Found: C, 28.9%; H, 1.93%.

EXAMPLE 28

Preparation of 3-[bis(trifluoromethyl)methoxy]-1,2-propanediol, using triethylamine as catalyst

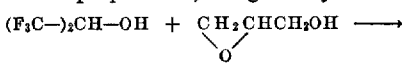

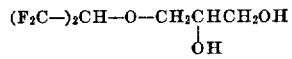

2,3-epoxy-1-propanol (7.4 grams, 0.1 mole) was added dropwise to a stirred mixture of the following kept under nitrogen and heated to the reflux temperature (at least 60° C.) until 120° C. was reached: 16.8 grams (0.1 mole) of 2H - hexafluoro - 2 - propanol and triethylamine (3% weight of the total charge). During the process, the temperature of the reaction mixture increased. As soon as 120° C. was reached, it was maintained at that temperature until 1 hour after the addition was completed. 3 - [bis(trifluoromethyl)methoxy] - 1,2 - propanediol was isolated by distillation at 86° C. at 1.5 mm. of mercury; $n_D{}^{25}=1.3578$.

Surface tensions of 0.01%, 0.1%, and 1% aqueous solutions were respectively 69.5, 66.4, and 49.6 dynes per centimeter. The product is the 1-to-1 adduct of 2,3-epoxy-1-propanol and a fluorinated secondary alcohol.

EXAMPLES 29 AND 30

Addition products of 2H - hexafluoro - 2 - propanol and 2,3 - epoxy - 1 - propanol reacted in molar ratios of 1:3 and 1:5, using triethylamine as catalyst Using a procedure similar to that of Example 28, but using 3 or 5 times, respectively, the quantity of 2,3-epoxy-1-propanol, two other adducts of 2H-hexafluoro-2-propanol were prepared. In carrying out each preparation, the amount of triethylamine was 3% of the combined weights of reactants. The products were not distilled. Measurements of surface activity were made with the following results, the values from Example 28 being included to facilitate comparison.

| Example | Molar ratio | Surface tension, dynes/cm. | | |
|---|---|---|---|---|
| | | 0.01% | 0.1% | 1% |
| 28 | 1:1 | 69.5 | 66.4 | 49.6 |
| 29 | 1:3 | 55.0 | 44.7 | 32.6 |
| 30 | 1:5 | 51.0 | 42.6 | 33.5 |

EXAMPLE 31

Preparation of 3-(1H,1H-heptafluorobutoxy)-1,2 propanediol

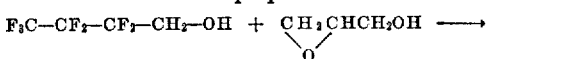

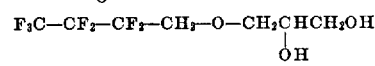

The 1-to-1 adduct of 1H,1H-heptafluoro-1-butanol and 2,3-epoxy-1-propanol was prepared by using a procedure similar to that of Example 25. The product, 3 - (1H,1H-heptafluorobutoxy) - 1,2 - propanediol, was isolated by distillation at 90° C. at 1 mm. of mercury. Surface tensions of 0.01%, 0.1%, and 1% aqeuous solutions were respectively 66.4, 51.0, and 27.7 dynes per centimeter.

EXAMPLE 32

Preparation of 3-(2,2,2-trifluoroethoxy)1,2-propanediol

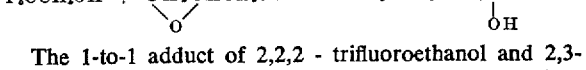

The 1-to-1 adduct of 2,2,2 - trifluoroethanol and 2,3-epoxy-1-propanol was prepared by using a procedure similar to that of Example 25, except that a 10% excess of 2,3 - epoxy - 1 - propanol was used. The product, 3 - (2,2,2 - trifluoroethoxy) - 1,2 - propanediol, was isolated by distillation. It boiled at 92 to 93° C. at 1.25 mm. of mercury. A purity of 96% was indictated by gas-liquid chromatography. Surface tensions of 0.1% and 1% aqueous solutions were respectively 70 and 65 dynes per centimeter.

EXAMPLE 33

Addition product of 2,2,2-trifluoroethanol and 2,3-epoxy-1-propanol reacted in the molar ratio of 1:2

A procedure similar to that of Example 32 was used, except that twice the proportion of 2,3-epoxy-1-propanol was used. The product was 1-to-2 adduct of 2,2,2 - trifluoroethanol and 2,3-epoxy-1-propanol. It was isolated by distillation (177° C. at 1.6 mm. of mercury). Surface tensions of 0.01%, 0.1%, and 1% aqueous solutions were respectively 62, 60, and 58 dynes per centimeter.

Although we have described but a few specific examples of our invention, we consider the case not to be limited thereby nor to the specific substances mentioned therein, but to include various other equivalent compounds of similar constitution as set forth in the claims appended hereto. It is understood that any suitable changes or variations may be made without departing from the spirit or scope of the inventive concept.

What is claimed is:

1. A fluorinated compound selected from the group consisting of:

$$HCF_2CF_2CH_2OCH_2CHCH_2OH$$
$$|$$
$$OH$$

$$H(CF_2)_4CH_2OCH_2CHCH_2OH$$
$$|$$
$$OH$$

$$H(CF_2)_8CH_2OCH_2CHCH_2OH$$
$$|$$
$$OH$$

$$(F_3C)_2CHOCH_2CHCH_2OH$$
$$|$$
$$OH$$

$$F_3CCF_2CF_2CH_2OCH_2CHCH_2OH$$
$$|$$
$$OH$$

and $$F_3CCH_2OCH_2CHCH_2OH$$
$$|$$
$$OH$$

2. A compound according to claim 1 of the formula:
$$HCF_2CF_2CH_2OCH_2CHCH_2OH$$
$$|$$
$$OH$$

3. A compound according to claim 1 of the formula:
$$H(CF_2)_4CH_2OCH_2CHCH_2OH$$
$$|$$
$$OH$$

4. A compound according to claim 1 of the formula:
$$H(CF_2)_8CH_2OCH_2CHCH_2OH$$
$$|$$
$$OH$$

5. A compound according to claim 1 of the formula:
$$(F_3C-)_2CH-O-CH_2CHCH_2OH$$
$$|$$
$$OH$$

6. A compound according to claim 1 of the formula:
$$F_3C-CF_2-CF_2-CH_2-O-CH_2CHCH_2OH$$
$$|$$
$$OH$$

7. A compound according to claim 1 of the formula:
$$F_3CCH_2OCH_2CHCH_2OH$$
$$|$$
$$OH$$

References Cited

UNITED STATES PATENTS

| | | | |
|---|---|---|---|
| 2,754,318 | 7/1956 | Conly | 260—615 |
| 3,358,033 | 12/1967 | Anello et al. | 260—615 |

LEON ZITVER, Primary Examiner

HOWARD T. MARS, Assistant Examiner

U.S. Cl. X.R.

252—351; 260—75, 468, 475, 481, 484, 485, 594

PO-1050
(5/69)

UNITED STATES PATENT OFFICE
CERTIFICATE OF CORRECTION

Patent No. 3,470,258      Dated September 30, 1969

Inventor(s) Giuliana C. Tesoro

It is certified that error appears in the above-identified patent and that said Letters Patent are hereby corrected as shown below:

Column 4, line 75, the formula should read:

Column 5, line 28, "Additional" should be changed to -- Addition --. Column 6, line 17, the formula should read:

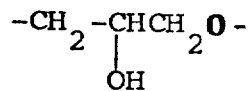

Column 9, line 8, that portion of the formula reading:

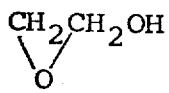    should read    

Column 10, Example 28, that portion of the second line of the formula reading:

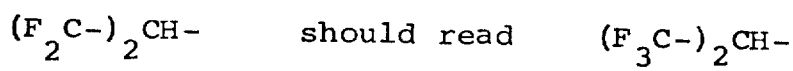

Column 10, Example 32, line 65, the title should read:

Preparation of 3-(2,2,2-trifluoroethoxy)-1,2-propanediol

SIGNED AND
SEALED
MAY 26 1970

(SEAL)
Attest:

Edward M. Fletcher, Jr.
Attesting Officer

WILLIAM E. SCHUYLER, JR.
Commissioner of Patents